(12) United States Patent
Eginton et al.

(10) Patent No.: US 6,343,950 B1
(45) Date of Patent: Feb. 5, 2002

(54) CONNECTOR ARRAYS

(76) Inventors: Mark E. Eginton, 343 Manzanita La., San Carlos, CA (US) 94070; Brian H. Steuer, 1090 Cloud Ave., Menlo Park, CA (US) 94025

( * ) Notice: Subject to any disclaimer, the term of this patent is extended or adjusted under 35 U.S.C. 154(b) by 0 days.

(21) Appl. No.: 09/511,828

(22) Filed: Feb. 23, 2000

Related U.S. Application Data

(60) Provisional application No. 60/121,195, filed on Feb. 23, 1999.

(51) Int. Cl.[7] .............................................. H01R 13/60
(52) U.S. Cl. .................. 439/540.1; 439/157; 439/298; 439/701; 439/357
(58) Field of Search ............................. 439/540.1, 701, 439/157, 292, 298, 357, 358

(56) References Cited

U.S. PATENT DOCUMENTS

| | | | |
|---|---|---|---|
| 995,627 A | 6/1911 | Murray | |
| 3,997,234 A | 12/1976 | Worman | |
| 4,990,094 A | 2/1991 | Chandler et al. | |
| 5,013,247 A | * 5/1991 | Watson | 439/55 |
| 5,326,279 A | 7/1994 | Sumida | |
| 5,328,388 A | * 7/1994 | Fust et al. | 439/544 |
| 5,569,040 A | 10/1996 | Sumida | |
| 5,971,801 A | 10/1999 | Kato et al. | |
| 6,095,852 A | * 8/2000 | Gregory, II | 439/540.1 |
| 6,190,192 B1 | * 2/2001 | White et al. | 439/292 |

OTHER PUBLICATIONS

Unknown manufacturer, "Connectors embedded in resin," date of manufacture unknown. The attorneys of record have a single physical sample of the "Connectors embedded in resin" in their possession. If the Examiner would like to inspect the sample, please notify the attorneys of record.

* cited by examiner

*Primary Examiner*—P. Austin Bradley
*Assistant Examiner*—Truc Nguyen
(74) *Attorney, Agent, or Firm*—Michael S. Lee; Shaw Pittman LLP

(57) ABSTRACT

The present invention discloses an array of connectors more specifically an ergonomically beneficial apparatus is disclosed for holding a plurality of connectors, RJ45 or fiber optic connectors for example, sufficiently fixed relative to each other such that a technician can easily insert and/or remove the array from a piece of equipment being tested. The connectors may be held snugly or may be free floating.

12 Claims, 14 Drawing Sheets

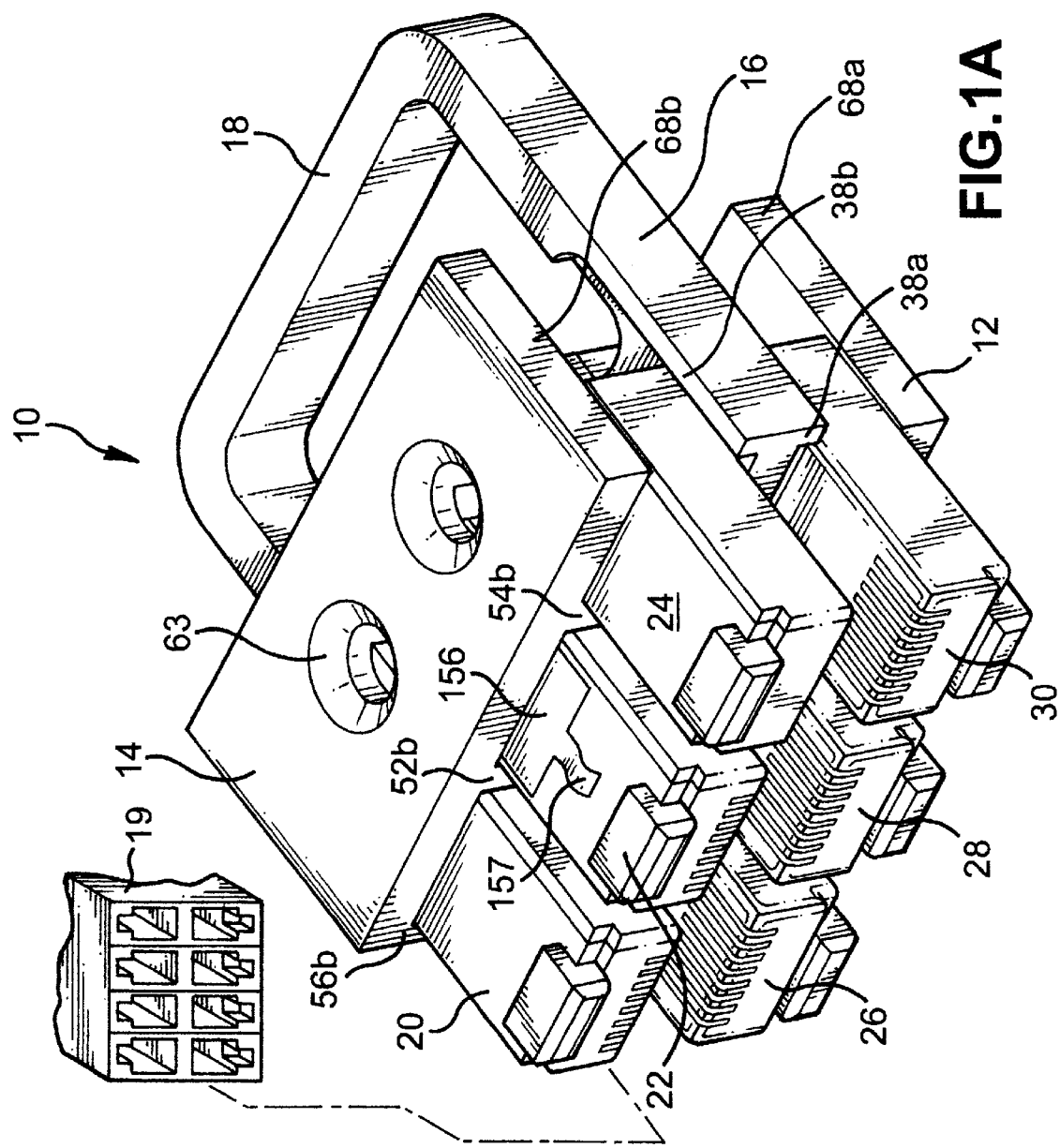

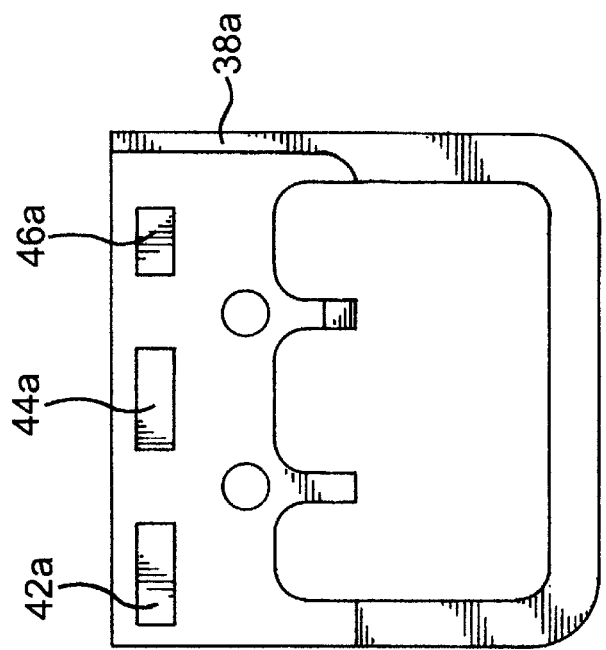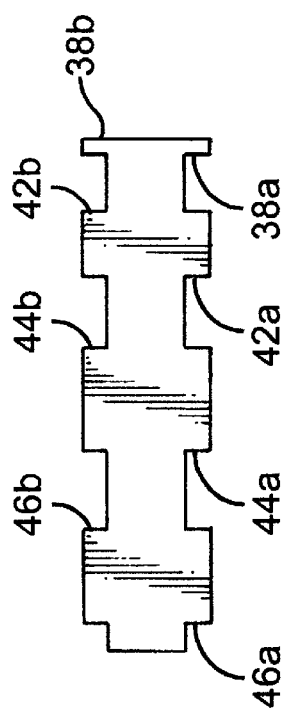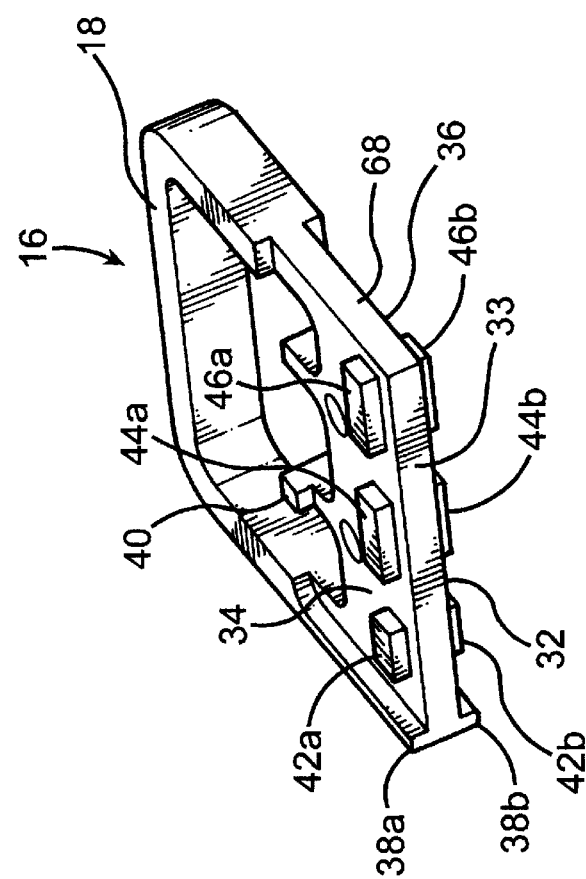

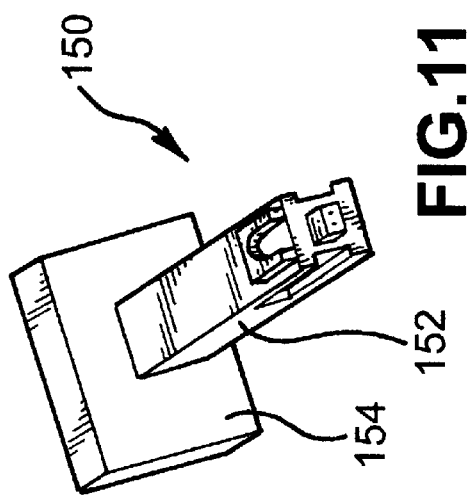
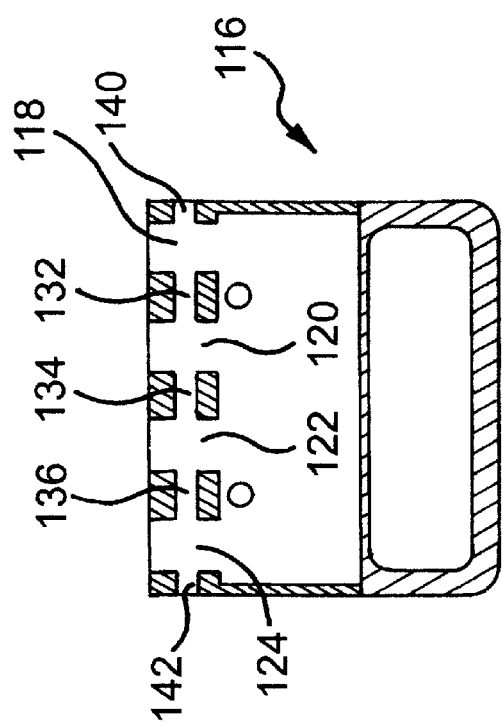
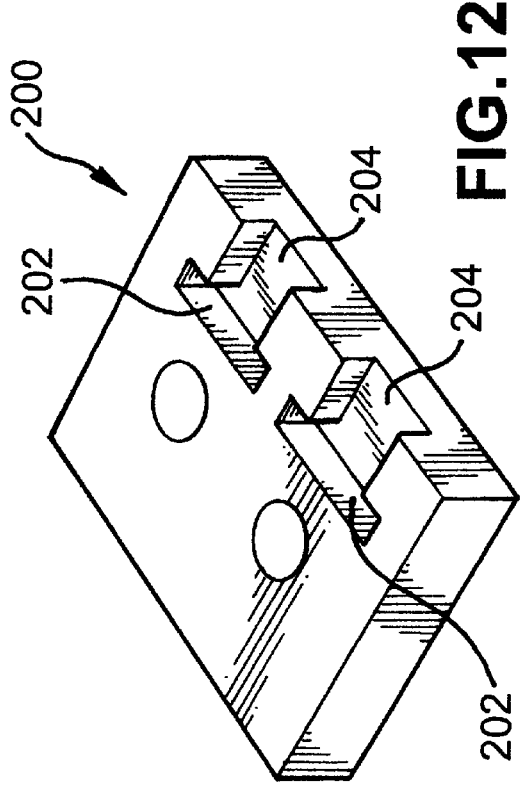

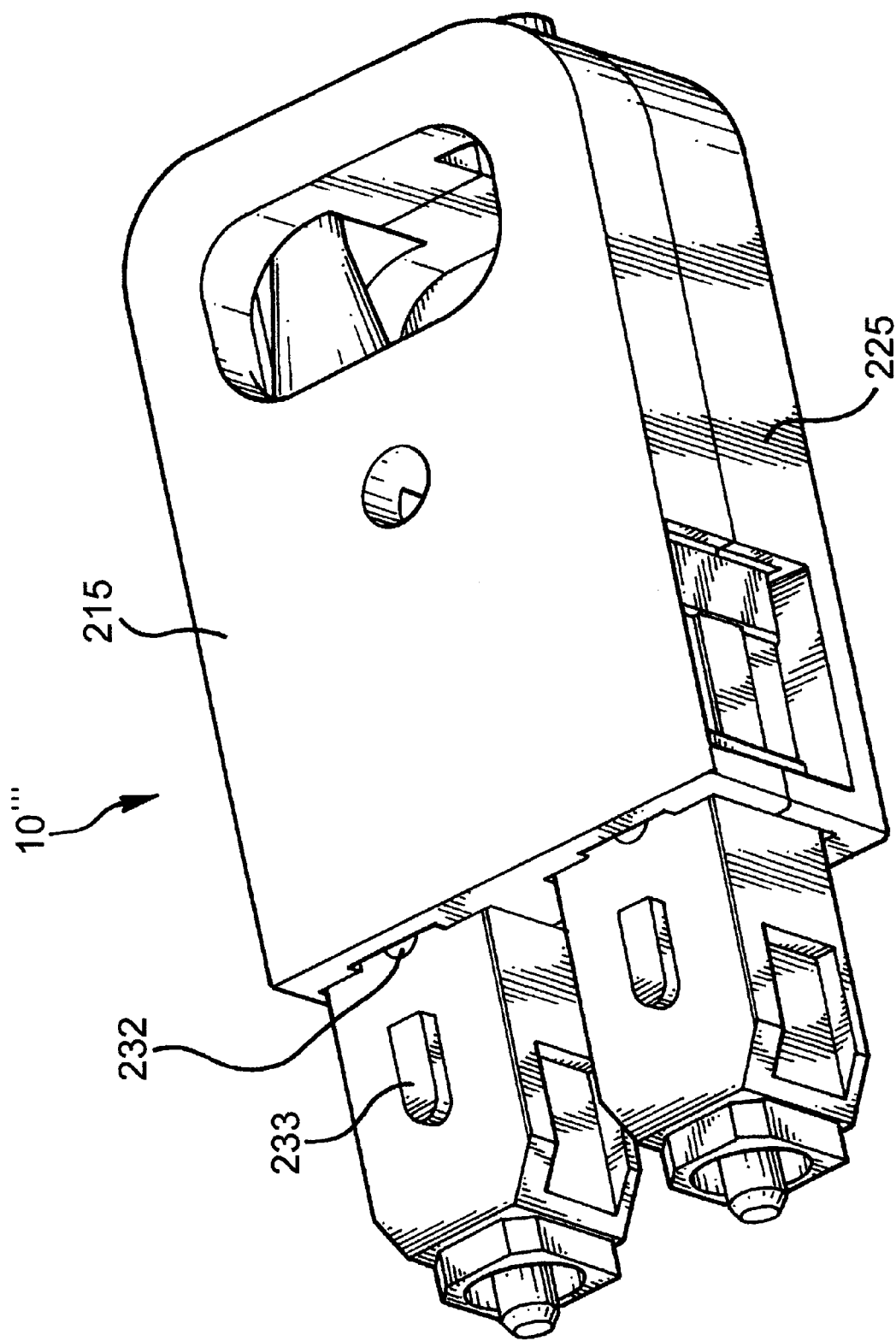

CONNECTOR ARRAYS

PRIORITY CLAIM

The present application claims priority to U.S. Provisional Application Serial No. 60/121,195, filed Feb. 23, 1999, which is incorporated herein by reference in its entirety.

FIELD OF THE INVENTION

The present invention relates generally to connectors used in connections with electronic equipment, including for example telecommunications or computer equipment. More specifically, the present invention relates to arrays of connectors.

BACKGROUND OF THE INVENTION

The telecommunications and computer industries manufacture sophisticated equipment, routers for example, that require testing prior to shipping the equipment to the purchaser. For example, data networking, voice networking and voice-mail equipment require the insertion and subsequent removal of multiple electrical or fiber optic connectors to test for proper communications between ports. In order to facilitate the repeated insertion and removal of many connectors for testing products, individual connectors must be inserted into each port of the equipment being tested. The connectors, RJ45 connectors for example, have a barbed latch for holding them secure in the port.

For a technician to insert a connector requires gripping it with the fingertips, and pushing the connector into the port until it locks into place. The technician repeats this for each port being tested. After the piece of equipment has cleared testing, the technician must then depress the latch of the connector, grip it with the fingertips and pull the connector free from the port. A technician must repeat this process for each port, and therefore, will repeat this process many times over on any given day.

The repeated insertion and withdrawal of individual connectors presents many problems to the industry. For instance, gripping the base with the fingertips and squeezing the latch, combined with pushing or pulling on the connector many times over causes repetitive motion injuries. Additionally, the repetitive nature of the job lends itself to mis-aligning a connector, which may either damage the equipment or the connector. A damaged piece of equipment, of course, must be repaired. A damaged connector can falsely indicate a failure in the equipment. In both cases, the problem must first be identified and then rectified, leading to increased cost and delay in delivering the equipment to the customer.

Thus, there is a need in the art for an apparatus that reduces the risk of repetitive motion injuries and the delays caused by mis-aligned connectors.

SUMMARY OF THE INVENTION

A preferred embodiment in accordance with the present invention is an apparatus for holding a plurality of connectors in a predefined array. The apparatus includes a first member having a first side. A plurality of key elements on the first side configured and dimensioned to substantially mate with a plurality of connectors. A second member is detachably mated to the first member. The first and second members define a plurality of slots, each of which is configured to receive and retain a connector. In an embodiment of the present invention the connectors are held snugly within the slots. In another embodiment the dimensions of the structure holding the connectors are reduced to permit the connectors to freely float within the slots, thereby permitting the construction of larger arrays.

BRIEF DESCRIPTION OF THE DRAWINGS

FIG. 1A is a perspective bottom view of a connector array in accordance with an embodiment of the present invention;

FIG. 2A is a perspective top view of the mid-section from the connector array of FIGS. 1A and 1B;

FIG. 2B is a top plan view of the mid-section from the connector array of FIGS. 1A and 1B;

FIG. 2C is a front view of the mid-section from the connector array of FIGS. 1A and 1B;

FIG. 10C is a top view of the connector array of FIG. 9 without the top plate installed; and FIG. 11 is a perspective view of a fiber optic connector;

FIG. 12 is a perspective view of a bottom plate of another embodiment in accordance with the present invention;

FIG. 14A is a perspective view of a connector array in accordance with another embodiment of the present invention.

DETAILED DESCRIPTION OF THE PREFERRED EMBODIMENTS

Figure 1B:
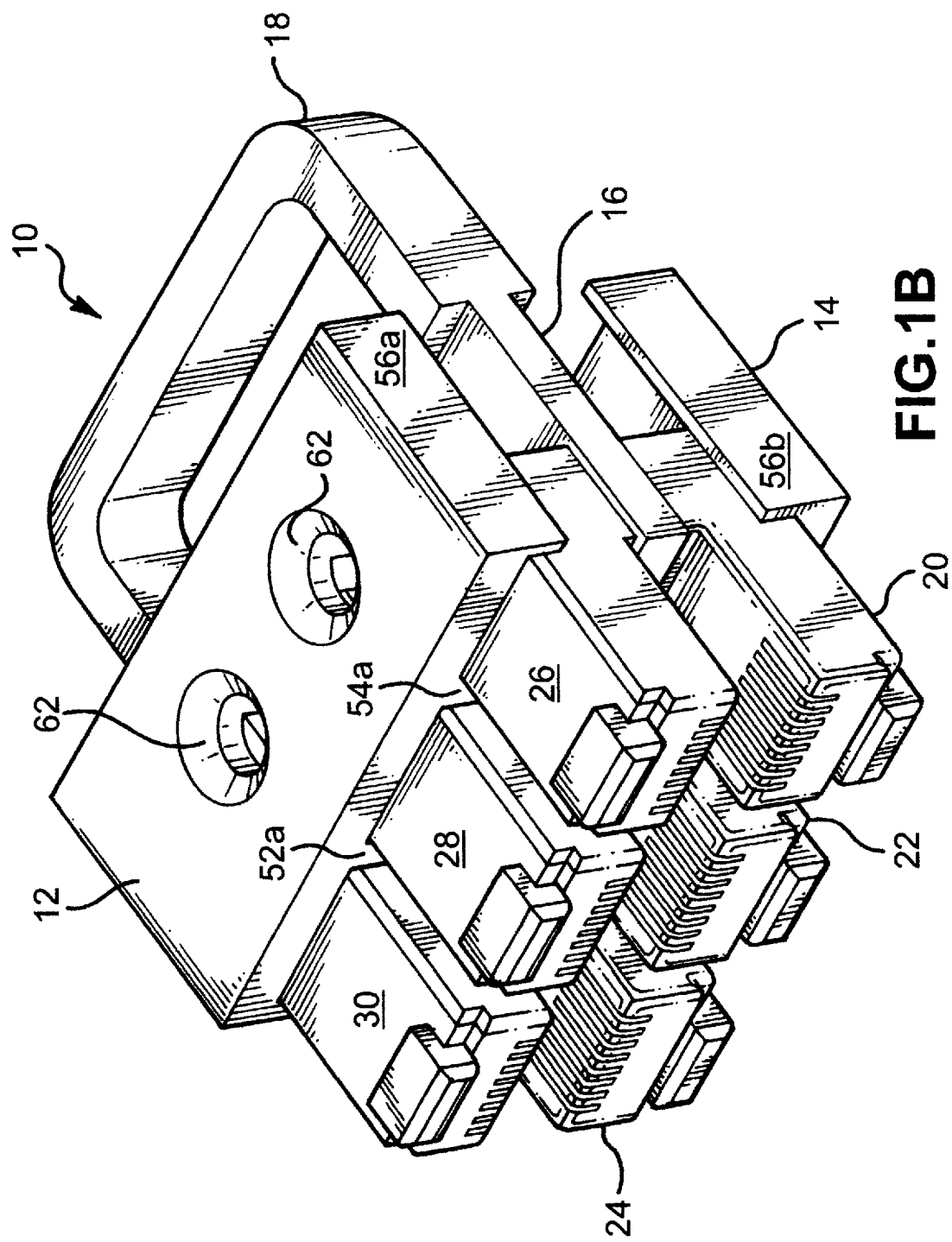
FIG. 1B is a perspective top view of the connector array depicted in FIG. 1A.

Referring to FIGS. 1A and 1B, connector array 10 in accordance with an embodiment of the present invention is shown. Array 10 has top plate 12, bottom plate 14, midsection 16, handle 18, and connectors 20, 22, 24, 26, 28, and 30. RJ45 connectors are depicted, however, the skilled artisan will recognize that other connector types, including any electrical or fiber optic connector may be used. Array, as used herein, refers to a plurality of connectors, which ma be as few as two. As shown in FIG. 1A, the connectors of connector array 10 are aligned to be inserted in an array of ports 19.

Referring again to FIGS. 1A and 1B, first and second internal walls 52a, 54a, 52b and 54b (of top plate 12 and bottom plate 14, respectively), lips 56a and 56b (of top plate 12 and bottom plate 14, respectively), walls 38a and 38b (of mid-section 16), top plate 12, bottom plate 14 confine each of the four sides of the connectors, thereby holding the connectors in a predefined spacial array as more thoroughly described below.

Referring to FIGS. 2A, 2B and 2C, mid-section 16 has handle 18 connected to and preferably integral with plate 32. Plate 32 has top side 34 and bottom side 36, which are mirror images of each other. Top side 34 has wall 38, post 40 and pegs 42, 44, and 46. Bottom side 36 has thee mirror image of each of these items. However, a skilled artisan will recognize that the configuration of the ports being tested will dictate how the various dimensional features of the present invention will be configured. For example, the pegs may be staggered relative to each other from top to bottom, or they may be staggered relative to front edge 33 of plate 32, forming an angled row of pegs. Width A of pegs 42, 44, and 46 is configured to snugly fit into width B of crimp slot 48 of connector 50 (best shown in FIG. 3). Length C of pegs 42 and 44, and length C' of peg 46 are configured to fit at least snugly into length D of crimp slot 48 (FIG. 3), but may be smaller. Length C' of peg 46 is preferably smaller than length D of crimp slot 48 to reduce the tolerances required during manufacturing. In this manner a connector can be press fit onto pegs 42, 44, and 46, such that the connector will not appreciably rotate or move in the z-direction (FIG. 1A) and such that connectors 20, 22, 24, 26, 28 and 30 may be moved into a predetermined spacing in the assembled array. The skilled artisan will readily recognize that the pegs may be indents to receive a protruding feature of a connector.

Figure 3:
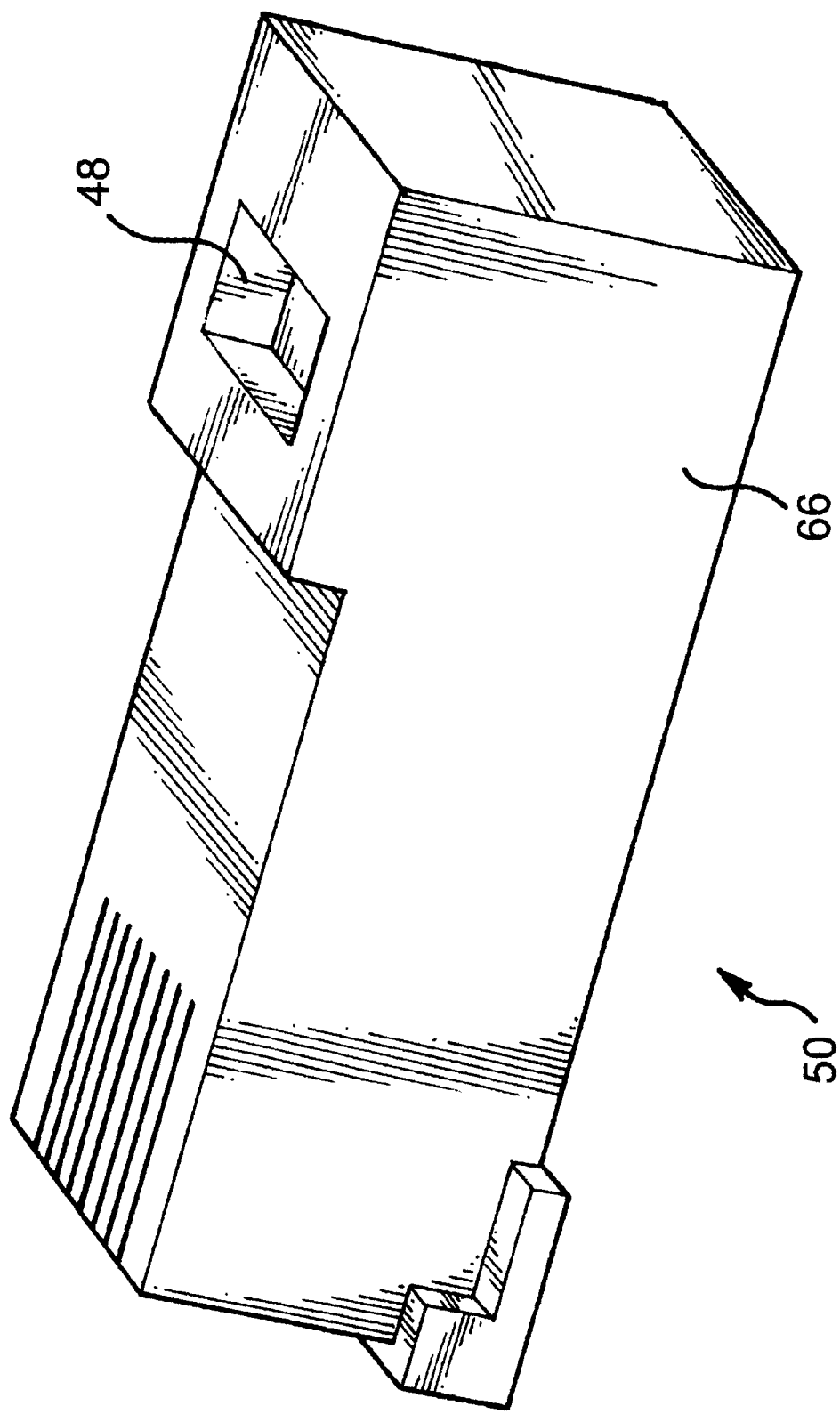
FIG. 3 is a perspective side view of an RJ-45 connector known in the prior art.
Figure 4A:
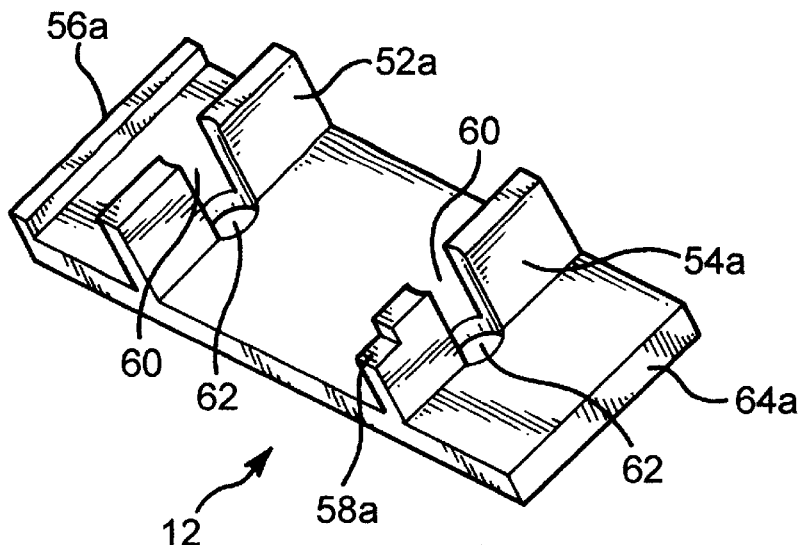
FIG. 4A is a perspective of the top plate from the connector array of FIGS. 1A and 1B.
Figure 4B:
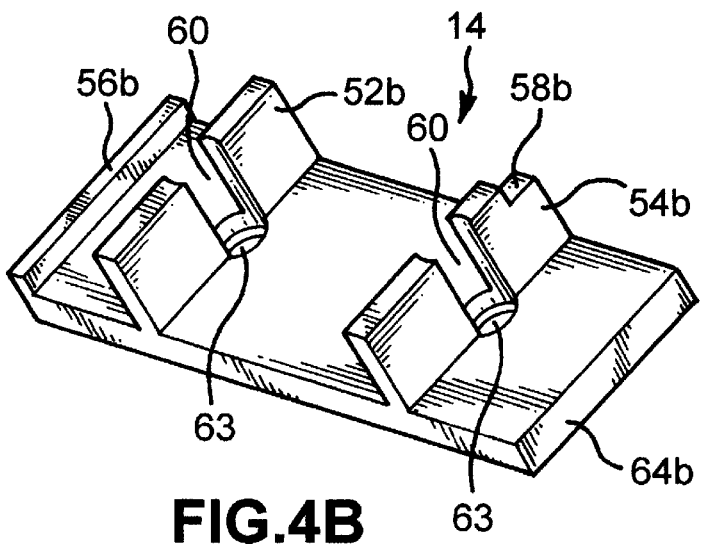
FIG. 4B is a perspective of the bottom plate from the connector array of FIGS. 1A and 1B.
Figure 4C:
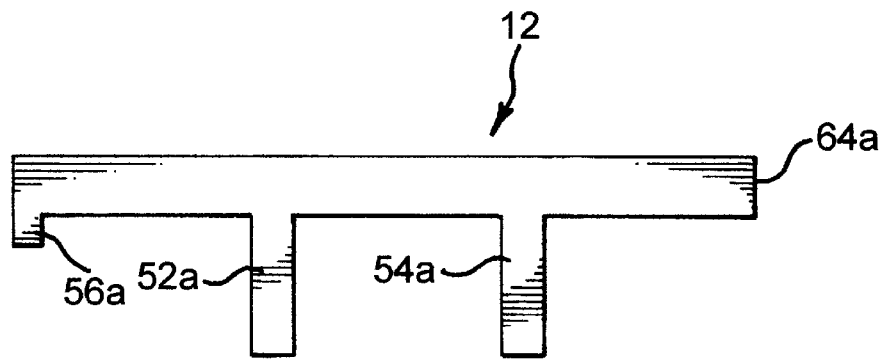
FIG. 4C is a front view of the top plate as shown in FIG. 4A.
Figure 5B:
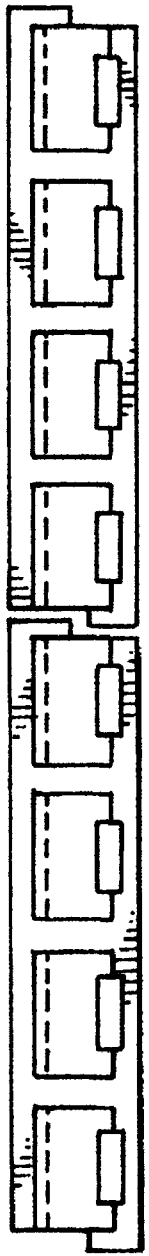
FIG. 5B is a front view of two adjacent connector arrays in accordance with another embodiment of the present invention.
Figure 5A:
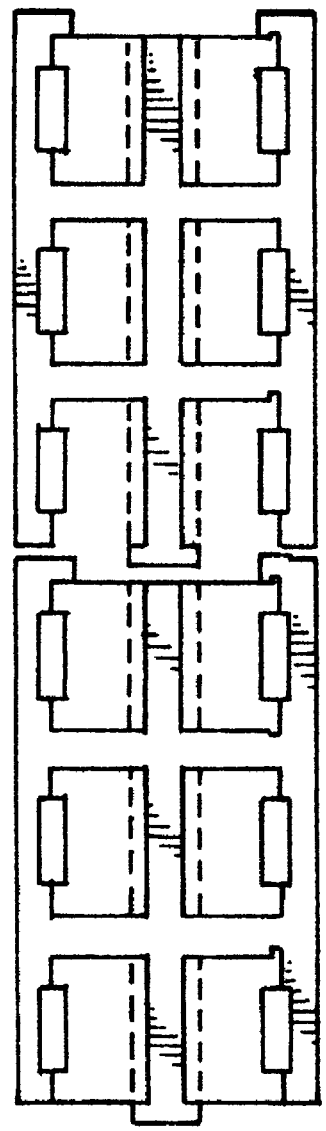
FIG. 5A is a front view of two adjacent connector arrays in accordance with an embodiment of the present invention.

Referring to FIGS. 4A, 4B and 4C, top plate 12 has first internal wall 52a, second internal wall 54a and lip 56a. Bottom plate 14, being the mirror image of top plate 12, has first internal wall 52b, second internal wall 54b, and lip 56b. Notch 58a and notch 58b are configured to fit over post 40 of mid-section 16, and gaps 60, and holes 62 and 63 are provided to permit a bolt to pass therethrough (not shown). Referring to FIG. 4C, distance E between first and second internal walls 52, 54, distance E' between first internal wall 52 and lip 56, and distance E" between second internal wall 54 and outer edge 64 are all approximately the width F (FIG. 3) of the back of connector 66. Width G of first and second internal walls 52, 54 is set in accordance with the desired spacing between each connector. Height H of first and second internal walls 52 and 54 is approximately equal to height I (FIG. 3) of back 66 of a connector 50. Height J of lip 56 (FIG. 4C) mand height J' (FIG. 2C) of wall 38 are preferably less than height I the of back of connector 66. Width K of lip 56, and width K' of wall 38 are preferably slightly less than the width G of internal walls 52 and 54 to permit adjacent placement of two arrays in a piece of equipment having many ports, as shown in FIG. 5A. A skilled artisan will recognize that these relative heights and distances may vary to achieve the specific dimensions and characteristics of the desired connector array in accordance with the present invention.

Referring to FIGS. 1A and 1B, connector array 10 is assembled by placing six connectors (each pair typically wired together forming a loop-back connector; however, connections to more distant connectors or to connectors on other equipment also may be made) on the pegs as described above (three on each side of mid-section 16). Bottom plate 14 is installed such that first and second internal walls 52b, 54b slide between middle connector 22 and outside connectors 20 and 24, and such that lip 56b abuts against outside connector 20. The outer portion of outside connector 24 is approximately flush with edge 68b of bottom plate 14; however, the outer portion of this connector abuts against wall 38b, as described above. Top plate 12 is then installed in the same fashion to the top side 34 of mid-section 16. The connector array is fastened together by bolts (not shown) inserted into holes 62 of top plate 12, through gaps 60 of first and second internal walls 52, 54, and threaded into holes 63 of bottom plate 14.

In the assembled connector array 10 first and second internal walls 52a, 54a, 52b and 54b abut against the connector that is adjacent on either side of the internal walls, lip 56a and 56b abut against the outer portion of outside connectors 20 and 26 (FIG. 1B), walls 38a and 38b abut against the outer portion of outside connectors 24 and 30, top and bottom plates 12, 14 abut the top portion of the connectors. This configuration confines each of the four sides of the connectors, preventing appreciable movement in the x- or y-direction. Additionally, pegs 42, 44, and 46 prevent appreciable movement of the connectors in the z-direction.

Referring to FIGS. 1A, 1B, and 5A, lips 56a and 56b (of top and bottom plates 12 and 14 respectively) overhang edges 68a and 68b (of top and bottom plates 12 and 14 respectively) by approximately width K. Walls 38a and 38b (of mid-section 16) hangover edges 64a and 64b (of top and bottom plates 12 and 14 respectively) by approximately width K'. Thus, lips 56a and 56b and walls 38a and 38b define an interlocking feature, as depicted in FIG. 5A, which permits placement of adjacent arrays into a piece of equipment.

Figure 6:
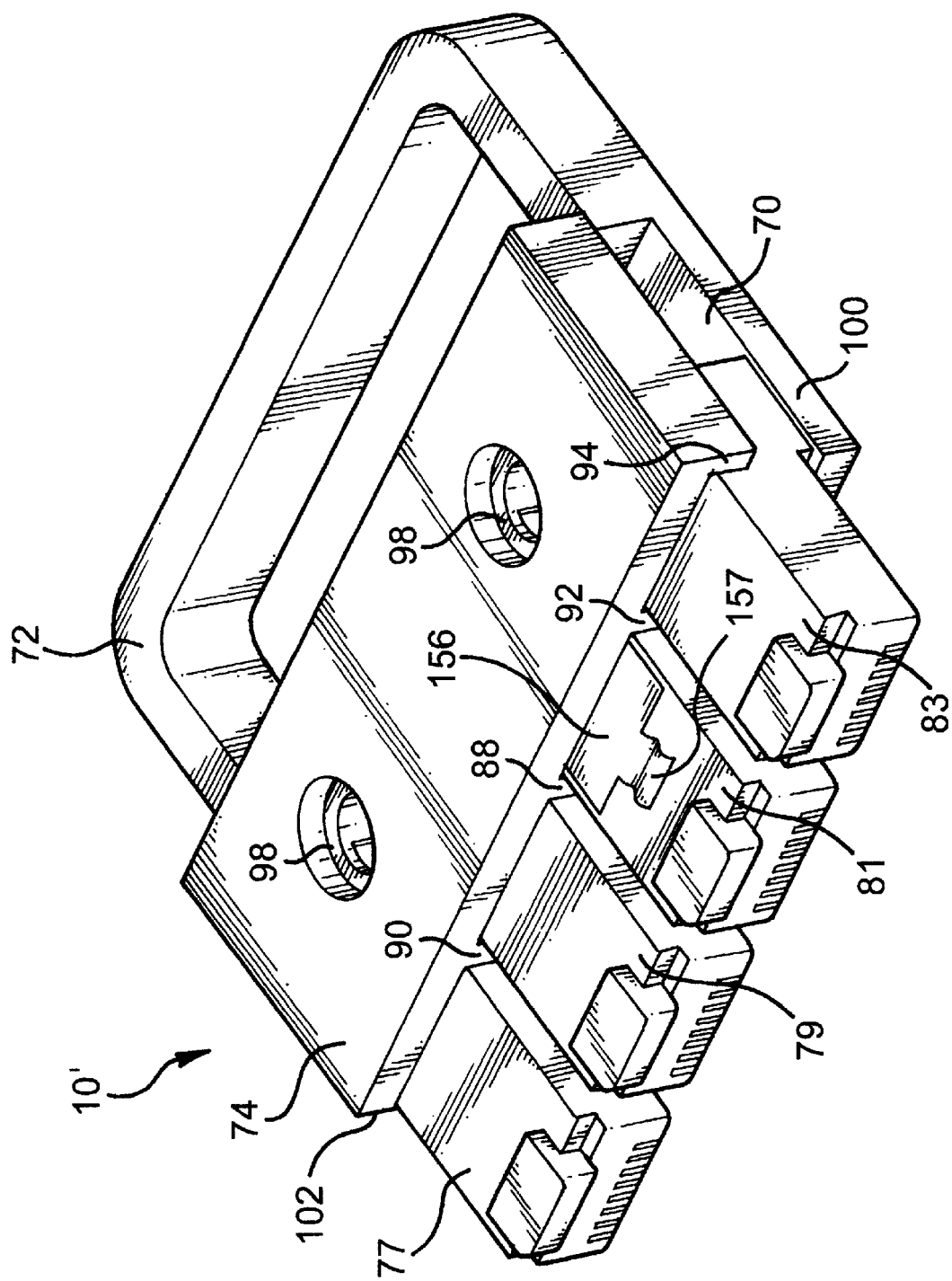
FIG. 6 is a perspective of a connector array in accordance with another embodiment of the present invention.

Referring to FIG. 6, connector array 10' in accordance with another embodiment of the present invention is depicted. Connector array 10' has top plate 70, handle 72, bottom plate 74, and connectors 77, 79, 81, and 83 aligned in a single row. The skilled artisan, will recognize that the row may be staggered aligning the connectors along an angle.

Figure 7:
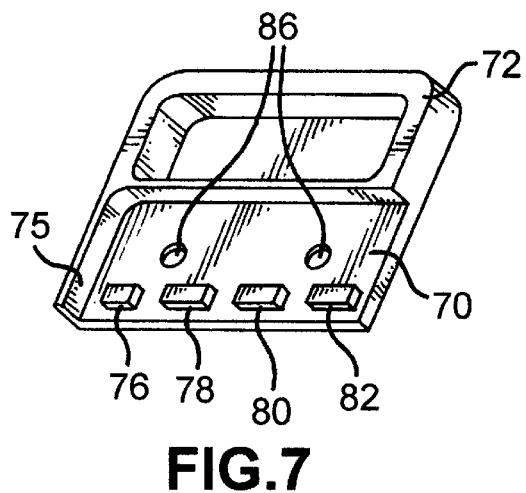
FIG. 7 is a perspective of the top plate from the connector array of FIG. 6.

Referring to FIG. 7, top plate 70 has handle 72(preferably integrally formed thereto), side wall 75 and four pegs 76, 78, 80 and 82, which are configured to snugly fit into crimp slot 48 of an RJ-type connector (FIG. 3). Holes 86 are provided to receive two bolts (not shown).

Figure 8A:
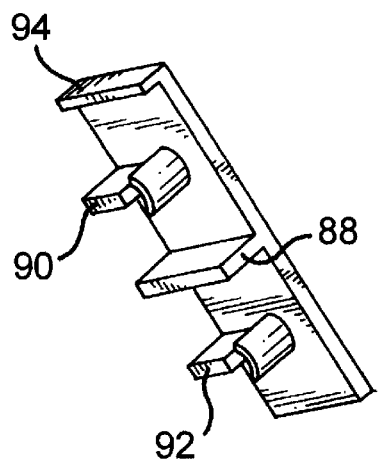
FIG. 8A is a perspective view of the bottom plate from the connector array of FIG. 6.
Figure 8B:
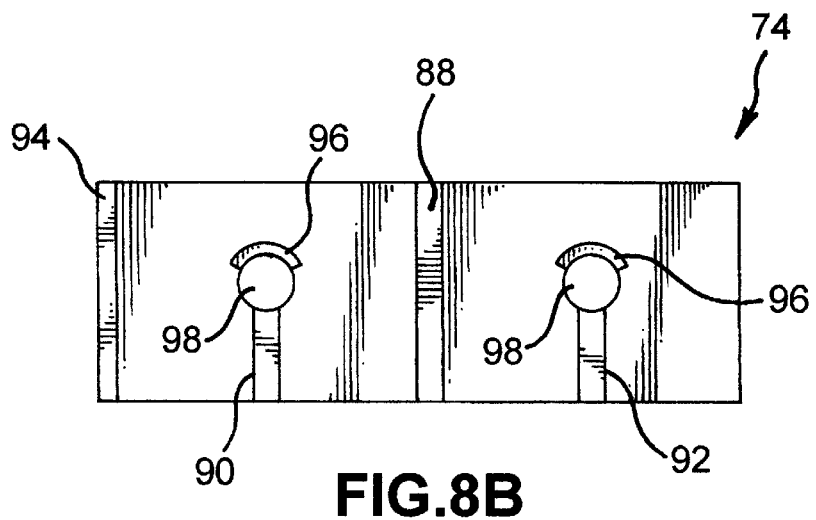
FIG. 8B is a top plan view of the bottom plate from the connector array of FIG. 6.

Referring to FIG. 8A and 8B, bottom plate 74 has center wall 88, two outside walls 90 and 92, and lip 94. Guards 96 are provided to keep wire or cable clear of the holes 98 when assembling connector array 10'. Center wall 88 preferably spans the entire width of bottom plate 74, however, it need only span a sufficient distance to prevent the connectors from moving out of a substantially aligned position when the array is fully assembled, as will be appreciated by the skilled artisan. Outside walls 90 and 92 span only a fraction of the width of bottom plate 74 to allow the bolts to pass through bottom plate 74. Similar to connector array 10 described above, the width of center wall 88 and both outside walls 90 and 92 are set to maintain a predetermined distance between the connectors in the assembled array. Similar to the embodiment described above, the width of lip 94 of bottom plate and side wall 75 of top plate 70 are preferably slightly less than the width of the internal walls, thereby permitting adjacent placement of two connector arrays, as shown in FIG. 5B.

Referring to FIG. 6, connector array 10' is assembled by placing four connectors on the pegs, as described above. Bottom plate 74 is installed such that center wall 88, and outside walls 90 and 92 slide between and abut connectors 77, 79, 81 and 83, and such that lip 94 abuts against outside connector 83, and side wall 75 of top plate 70 abuts against the other outside connecter 77 (not shown). The outer portion of outside connector 83 is approximately flush with edge 100 of top plate 70, and the outside portion of outside connector 77 is approximately flush with edge 102 of bottom plate 74 to provide clearance when two adjacent arrays are used. The connector array is fastened together by bolts (not shown) inserted into holes 86 of top plate 70, through guards 96 and threaded into holes 98 of bottom plate. This configuration, as described above, confines each of the four sides of the connectors, preventing any appreciable movement in the x- or y-direction. Additionally, pegs 76, 78, 80, and 82 prevent any appreciable movement of the connectors in the z-direction.

The connector arrays described above have connectors held snugly in a predetermined spacial arrangement. However, the connectors do not necessarily need to be held snugly in the array, but may be "free floating" within a set tolerance range. For example, reducing the thickness of the walls between the connectors, slightly increasing the height of these walls (thereby ensuring clearance between the plates and the connectors), and/or slightly reducing the width and/or length of the pegs permits the connectors to have limited free movement at least in the x-, y- and/or z-directions, and/or rotationally about any of these axes, thereby creating an array of "free floating" connectors. The free movement described above reduces the tolerance requirements for the structural components of the array, while maintaining the required spacial arrangement of the connectors within the array. The reduction in tolerance requirements permits the construction of much larger arrays, for example eight or more connectors, because cumulative tolerance errors are reduced. A small amount of play is not detrimental to alignment because the front end of the connectors and/or the openings of the ports help guide the connectors when being inserted. Additionally, the movement permits errors in the spacing of the ports to be tested. Thus, a small amount of movement permits self-alignment, reduces the tolerances required for the manufactured parts of the arrays, and reduces the tolerances required in the equipment being tested.

Figure 9:
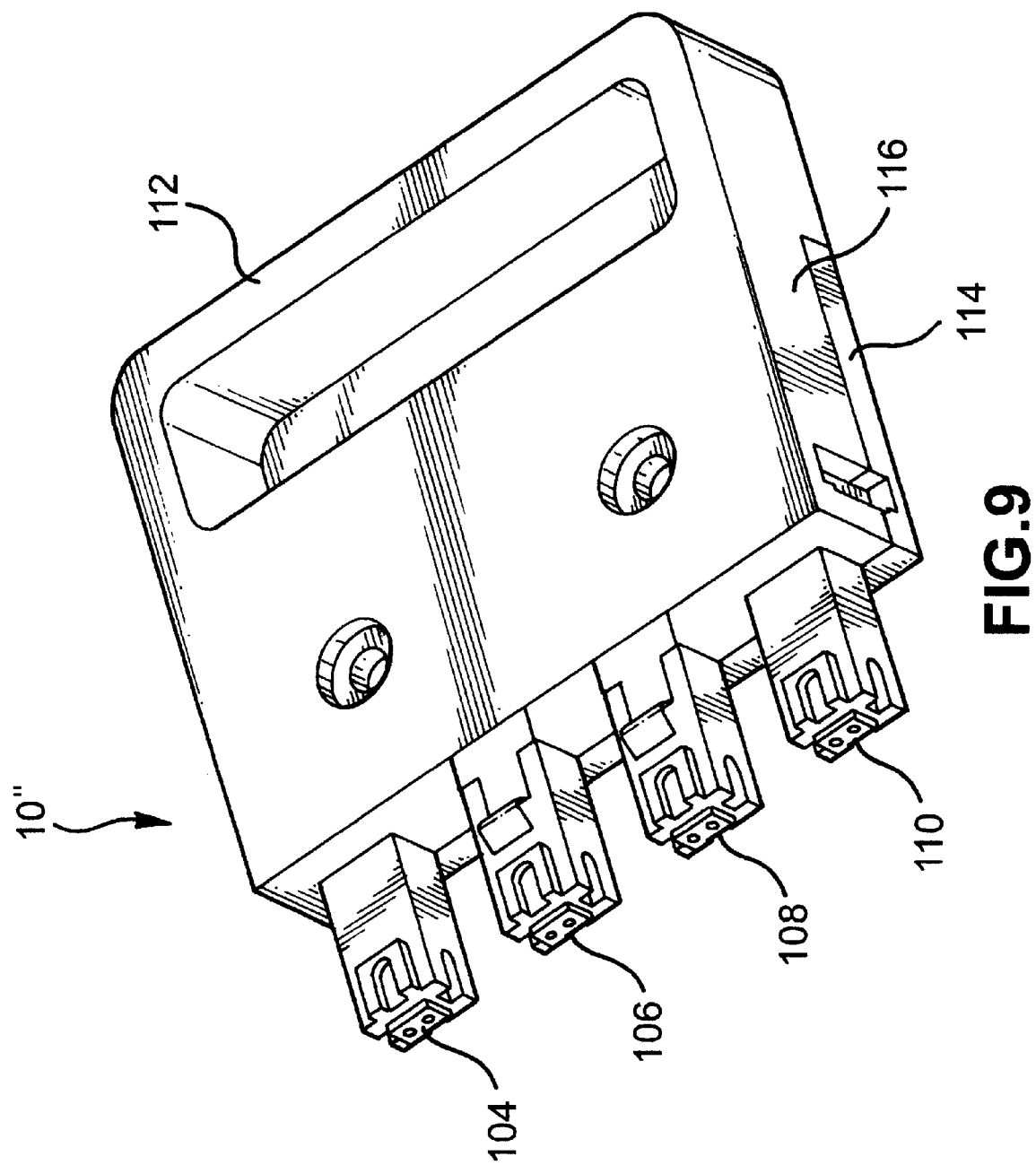
FIG. 9 is a perspective view of a connector array in accordance with another embodiment of the present invention.

Referring to FIG. 9, connector array 10" is an array of fiber optic connectors 104, 106, 108 and 110 in accordance with another embodiment of the present invention. In this particular example MTRJ-type connectors are depicted, however other types may be used without exceeding the scope of the present invention, including without limitation SC-type and LC-type connectors. Connector array 10" has handle 112, top plate 114, and body portion 116. Handle 112 and body portion 116 are connected to and preferably integral with each other.

Figure 10B:
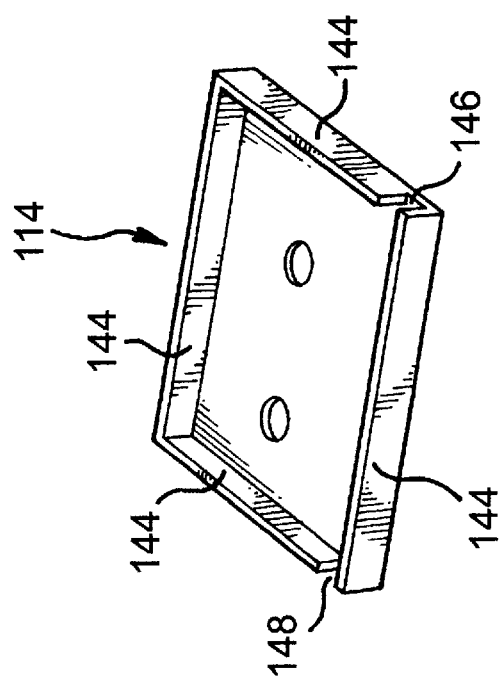
FIG. 10B is a perspective view of the top plate from the connector array of FIG. 9.
Figure 10A:
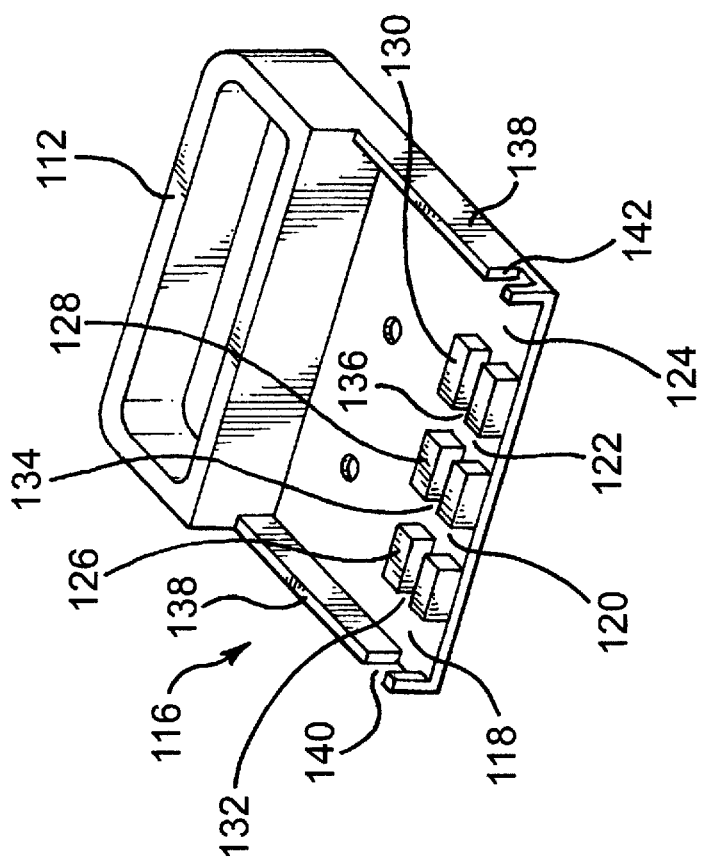
FIG. 10A is a perspective view of the body portion from the connector array of FIG. 9.

Referring to FIGS. 10A, 10B and 10C, body portion 116 has four notches 118, 120, 122, and 124 where each notch is separated by a pair of parallel walls 126, 128, and 130. Each of the parallel walls form grooves 132, 134 and 136, which grooves are substantially aligned with each other. Peripheral wall 138 of body portion 116 has two grooves 140 and 142, which grooves substantially align with grooves 132, 134, and 136. Top plate 114 has peripheral wall 144 having two notches 146 and 148 therein, which notches are configured to align over grooves 140 and 142 in peripheral wall 138 of body portion 116, when connector array 10" is assembled.

Referring to FIG. 11, fiber optic connector 150 has rectangular body 152 with width L and height M, and ridge 154 at one end of the connector. Ridge 154 has a slightly larger width N and height O than rectangular body 152, and has a thickness P. Width Q (FIG. 10C) and height R (FIG. 10A) of notches 118, 120, 122, and 124 are slightly larger than width L and height M of rectangular body 152 of connector 150, respectively, and slightly smaller than width N and height O of ridge 154 of connector 150, respectively. Grooves 132, 134, 136, 140 and 142 all have approximately the same thickness S (FIG. 10C) that is slightly larger than thickness P of ridge 154.

Referring to FIG. 9, to assemble connector array 10" a connector is inserted into a notch such that ridge 154 of the connector extends partially into the two grooves adjacent to the notch. The parallel walls, or the peripheral wall 138 of body portion 116 permit a slight amount of play in the x- y- and z-directions and a slight amount of rotation about each of these axes, but prevents the connector from sliding out of place. After each of the connectors has been inserted, top plate 114 is placed over body portion 116, such that notches 146 and 148 of peripheral wall 144 substantially align with grooves 140 and 142. Top plate 114 encloses the connectors, such that they may freely float in the x- y- and z-directions without permitting the connectors to slide out of place, however, the connectors may be made snug, as in previously described embodiments, without exceeding the scope of the present invention. As described above, an array of free floating connectors reduces the tolerance requirements for the structural components of the array, while maintaining the required spacial arrangement of the connectors within the array. Additionally, as with other embodiments described herein, top plate 114 and body portion 116 preferably form an enclosure to protect the cables attached to the connectors. This prevents the cables, whether fiber optic or electrical, from being inadvertently damaged during use of the array or equipment into which the array is inserted.

The skilled artisan will also readily recognize that other configurations of this embodiment will fall within the scope of the invention. For example referring to FIG. 12, top plate (not shown) and bottom plate 200 are mirror images of each other. Groove 202 is configured to receive ridge 154 (FIG. 11) of the connector and notch 204 is provided to receive rectangular body 152 of the connector. The top plate (not shown) with mirroring features is secured to bottom plate 200, thereby enclosing a ridge 154 in groove 202. A skilled artisan will recognize that by appropriately dimensioning groove 202 and notch 204 the top plate need only be a flat piece of material.

Figure 13B:
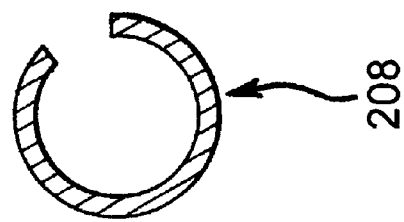
FIG. 13B is a cross-section of a spring ring.
Figure 13A:
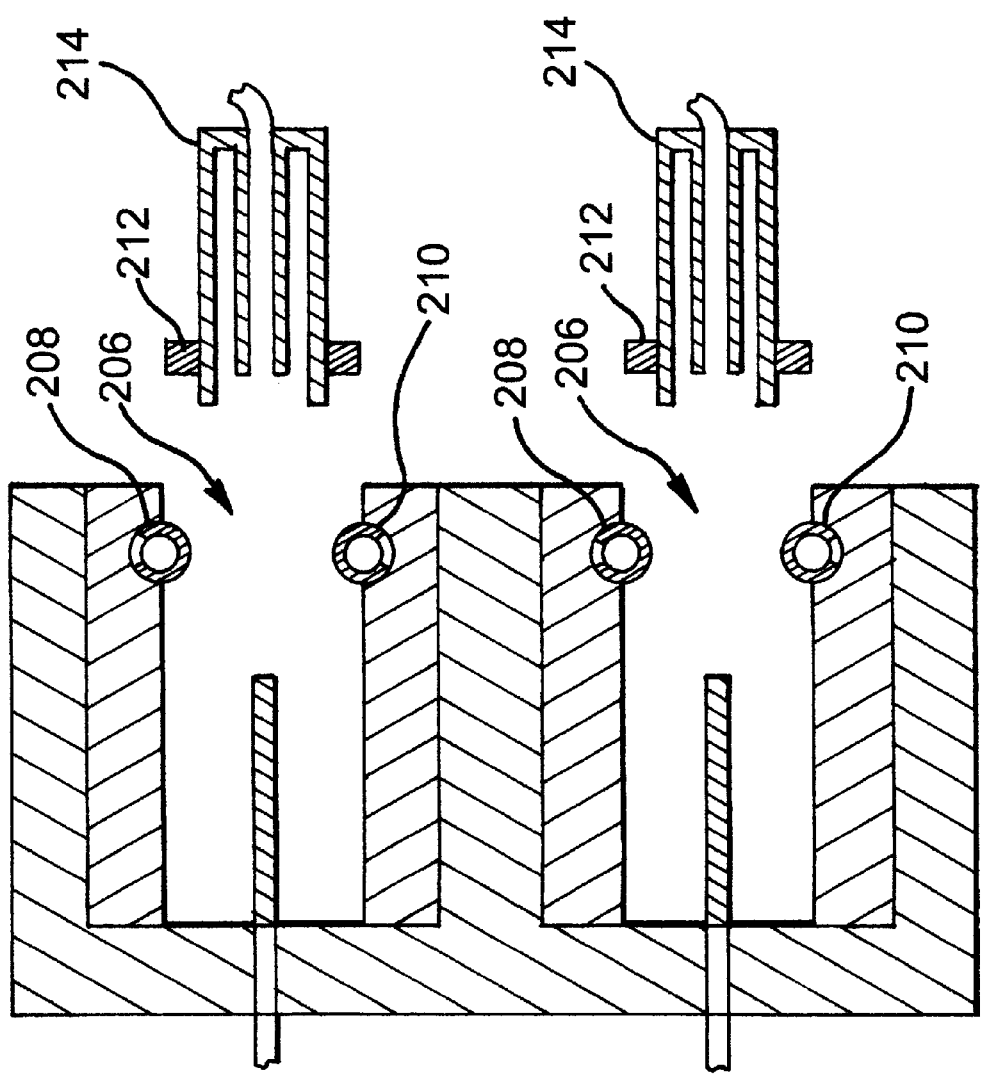
FIG. 13A is a cross-sectional view of a connector array in accordance with another embodiment of the present invention.

The present invention may be configured for an array of co-axial cable connectors. For example, referring to FIG. 13A, an array of co-axial connectors 206, in accordance with another embodiment of the present invention, having a co-axial wire extending therein is provided. The connectors each have a spring ring 208 (FIG. 13B) contained within groove 210. Spring ring 208 may expand outward within groove 210. In operation of each co-axial connector in the array is slid over a corresponding female slot in an array of female slots. Rim 212 of a female slot 214 is slightly wider in diameter than the inner diameter of spring ring 208, and will expand the ring when passed therethrough, after which rim 212 will abut against spring ring 208 preventing the inadvertent separation of the array from the array of female slots. The skilled artisan will recognize that rim 212 may be any extension including without limitation the posts of a bayonet fitting.

Figure 14B:
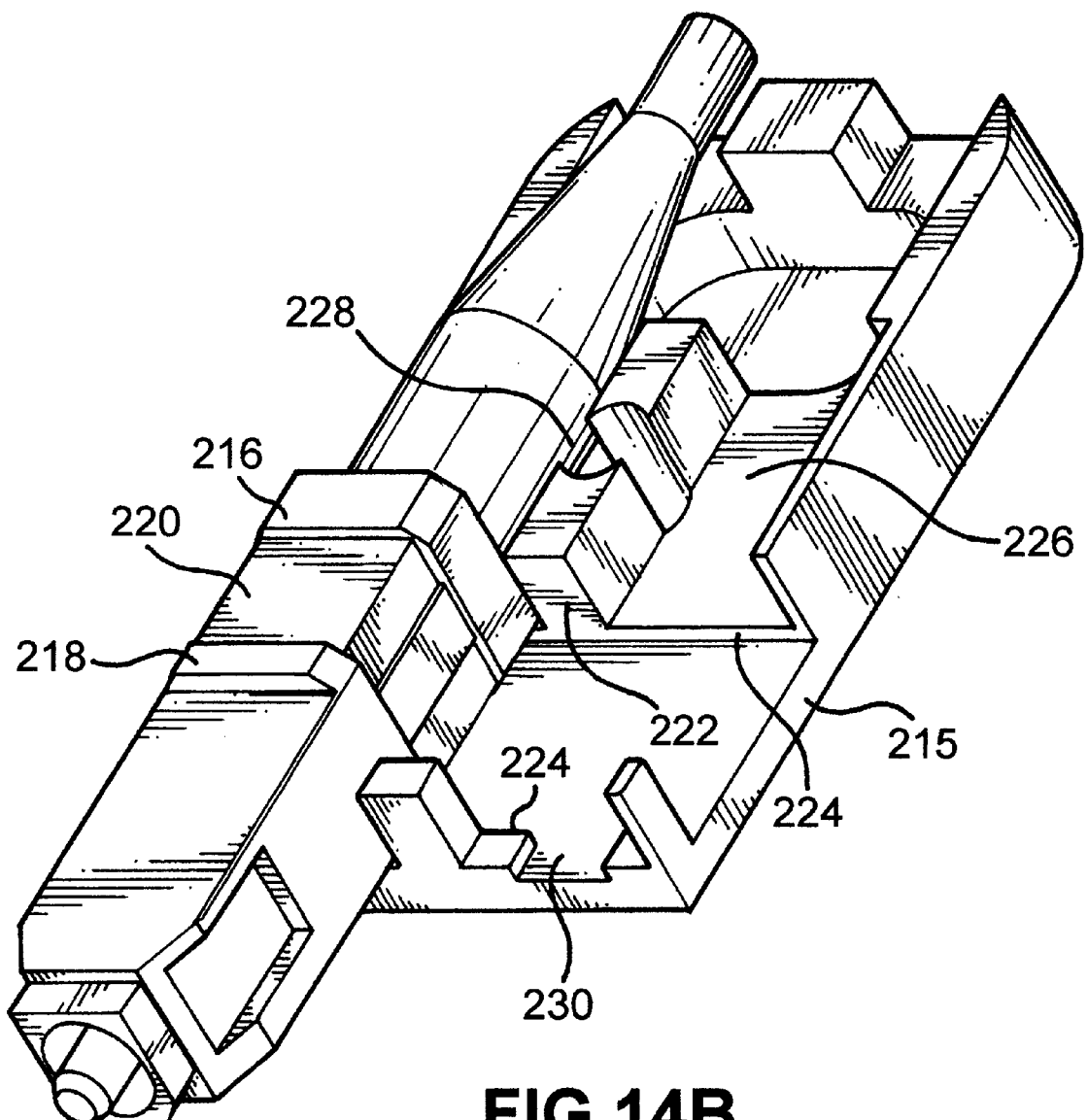
FIG. 14B is a perspective view of the bottom plate from the connector array of FIG. 14A.

Referring to FIG. 14A, array 10''' has bottom plate 215 and top plate 225 configured to receive SC-type fiber optic connectors, in accordance with another embodiment of the present invention. Referring to FIG. 14B, in this embodiment the connector has two ridges 216 and 218 spaced apart by a rectangular portion of the body 220. Ridge 216 abuts against center wall 222 and lower abutment 224. Ridge 218 abuts against outer abutment 224. Alleyways 226 and 228 receive the cylindrical portion of the connectors. Top plate 225 has mirroring features except preferably does not have tab receiving slot 230, as the top portion of the connector does not have a tab 232 (FIG. 14B). When assembled, array 10''' has multiple SC-type connectors, either free floating or snug, held in an array. A second tab 233 of the connector prevents the over insertion of the connector into a receiving port (not shown). The skilled artisan will recognize that the structure may be expanded to hold more than two connectors.

Referring to FIG. 1A, 6 and 9, as an option one or two clips 156 may be sandwiched between the top and/or bottom plates in these or any embodiments. Clips 156 bias into the slots used to accept the normal barb latch of the prior art connectors. Preferably the barb latch, to the extent one is present, is entirely removed from each of the connectors. In a "free floating" array clips 156 should stay sufficiently clear of the connectors so as not to substantially interfere with the movement thereof. When the array of connectors is inserted into the array of ports, portion 157 of clip 156 is biased into an indent (not shown) within the array of ports, which is used to receive the barb latch normally on an off the shelf connector. Clip 156 also may serve to ensure the connectors are inserted into the ports a sufficient distance. The advantage of using clips 156 in accordance to the present invention is that they do not require depression to release the array from the equipment being tested while still securing the arrays thereto. It will be recognized that clips 156 are not absolutely necessary, but are preferred particularly in use with fiber optic connector arrays.

A technician using the connector arrays described above, with snug or "free floating" connectors, with or without a clip, holds the handle, aligns the connectors with the ports of the equipment to be tested, pushes handle to insert the connectors into the ports. After the testing is completed, the technician grabs the handle and pulls to remove connector array from the equipment. The present invention permits single motion installation and single motion removal of multiple connectors. Thus, use of the connector array of the present invention significantly reduces the risk of repetitive motion injury. Additionally "free floating" arrays reduces the manufacturing tolerances, thereby permitting construction of much larger arrays. An additional advantage is that the preferred modularity of the present invention permits replacement of worn parts, reducing the cost to the user of purchasing an entirely new array.

The materials used for the structural components of the present invention may be selected from any structurally rigid material capable of being molded, machined or cast. For example and without limitation, materials may include resins, plastics, metals or any combination thereof. Preferably all of the structural components are machined aluminum. Preferably the bolts are hardened steel and a threaded steel insert is pressed into the lower plate or body to avoid stripping of the softer aluminum. The skilled artisan will recognize that arrays according to the present invention may be molded from a single piece of material, such as in over-molding or insert molding. Preferably the connectors are purchased from any of the many suppliers of metal, copper or fiber optic connectors, although any custom made connector would fall within the scope of the present invention. The skilled artisan will readily recognize that fewer or many more connectors may be used in the arrays described above without exceeding the scope of the present invention.

Although various embodiments of the present invention have been described, the descriptions are intended to be merely illustrative. Thus, it will be apparent to the skilled artisan that modifications may be made to the embodiments as described without departing from the scope of the claims set forth below.

What is claimed is:

1. A connector array comprising:
    a base member retaining at least an N number of substantially identical connectors of the same gender, N being an integer greater than or equal to 2;
    all of the N connectors having a first end and a second end, the first end adapted to engage a matching connector of the opposite gender;
    the base member also retaining an X number of clips, X being an integer less than N and including one;
    wherein one of the X number of clips is a first clip and wherein one of the N connectors is a first connector, the first clip being associated with a first connector at the second end of the first connector.

2. A connector array according to claim 1, wherein the first clip is mounted as a cantilever with the attached end proximate the second end of the first connector and a free end proximate the first end of the first connector.

3. A connector array according to claim 1, wherein all of the N connectors are made of a non-metallic material and the X number of clips are made of a metallic material.

4. A connector array according to claim 1, wherein the first clip is bent towards the first connector.

5. A connector array according to claim 1, wherein the first connector is an electrical connector.

6. A connector array according to claim 1, wherein the first connector is an optical connector.

7. A connector array comprising:
    a base member retaining at least an N number of substantially identical connectors of the same gender, N being an integer greater than or equal to 2;
    all of the N connectors having a first end and a second end, the first end adapted to engage a matching connector of the opposite gender;
    the base member also retaining an X number of clips, X being an integer less than or equal to N and including zero;
    wherein one of the X number of clips is a first clip and wherein one of the N connectors is a first connector, the first clip being associated with a first connector at the second end of the first connector.

8. A connector array according to claim 7, wherein the first clip is mounted as a cantilever with the attached end proximate the second end of the first connector and a free end proximate the first end of the first connector.

9. A connector array according to claim 7, wherein all of the N connectors are made of a non-metallic material and the X number of clips are made of a metallic material.

10. A connector array according to claim 7, wherein the first clip is bent towards the first connector.

11. A connector array according to claim 7, wherein the first connector is an electrical connector.

12. A connector array according to claim 7, wherein the first connector is an optical connector.

* * * * *